United States Patent
Segura et al.

(10) Patent No.: US 9,522,464 B2
(45) Date of Patent: Dec. 20, 2016

(54) MULTI-POSITION UTILITY HOOK ASSEMBLY FOR A TOOL

(75) Inventors: Ricardo Segura, Lake In The Hills, IL (US); Ryan L. Francis, Palatine, IL (US)

(73) Assignee: Illinois Tool Works Inc., Glenview, IL (US)

( * ) Notice: Subject to any disclaimer, the term of this patent is extended or adjusted under 35 U.S.C. 154(b) by 634 days.

(21) Appl. No.: 13/108,914

(22) Filed: May 16, 2011

(65) Prior Publication Data

US 2012/0292472 A1 Nov. 22, 2012

(51) Int. Cl.
 *B25F 5/02* (2006.01)
 *B25C 7/00* (2006.01)
 *B25H 3/00* (2006.01)

(52) U.S. Cl.
 CPC . *B25F 5/02* (2013.01); *B25C 7/00* (2013.01); *B25H 3/006* (2013.01)

(58) Field of Classification Search
 CPC .............. B25H 3/006; B25H 3/00; B25C 7/00
 USPC ........... 224/268, 269, 255, 904; 248/225.21; 24/374, 600.6, 598.5, 589.6
 See application file for complete search history.

(56) References Cited

U.S. PATENT DOCUMENTS

| | | | |
|---|---|---|---|
| 3,286,315 A * | 11/1966 | Price | 24/374 |
| 3,478,550 A * | 11/1969 | Salvesen | 70/459 |
| 4,406,064 A | 9/1983 | Goss | |
| 4,483,473 A | 11/1984 | Wagdy | |
| 4,522,162 A | 6/1985 | Nikolich | |
| 4,787,145 A * | 11/1988 | Klicker et al. | 30/275.4 |
| 6,145,724 A | 11/2000 | Shkolnikov et al. | |
| 6,321,622 B1 * | 11/2001 | Tsuge | B25F 5/02 81/185.2 |
| 6,612,476 B2 * | 9/2003 | Smolinski | 227/120 |
| 6,679,414 B2 | 1/2004 | Rotharmel | |
| 7,127,971 B1 | 10/2006 | Braun | |
| 7,222,767 B1 * | 5/2007 | Yang | 227/130 |
| 7,306,052 B2 * | 12/2007 | Vahabi-Nejad et al. | 173/217 |
| 7,455,001 B1 * | 11/2008 | Waters | B25H 3/00 16/406 |
| 8,087,556 B2 * | 1/2012 | Oomori et al. | 224/269 |
| 8,308,034 B2 * | 11/2012 | Shibata et al. | 224/269 |
| 8,407,862 B2 * | 4/2013 | Bluma | 24/3.6 |
| 2002/0117531 A1 | 8/2002 | Schell et al. | |

(Continued)

FOREIGN PATENT DOCUMENTS

DE 102004032788 A1 * 2/2006
EP 1 231 028 8/2002

(Continued)

OTHER PUBLICATIONS

International Search Report and Written Opinion for International Application No. PCT/US2012/037927, mailed Oct. 15, 2012 (15 pages).

(Continued)

*Primary Examiner* — Nathan J Newhouse
*Assistant Examiner* — Todd Anderson
(74) *Attorney, Agent, or Firm* — Neal, Gerber & Eisenberg LLP

(57) ABSTRACT

A multi-position hook assembly for use in a tool that includes a hook having a first leg and a second leg joined by a top span member, and a mounting member configured for slidably receiving the top span member and releasably locking the hook in a plurality of positions.

15 Claims, 7 Drawing Sheets

(56) References Cited

U.S. PATENT DOCUMENTS

| | | | |
|---|---|---|---|
| 2003/0132264 A1 | 7/2003 | Smolinski | |
| 2006/0091168 A1* | 5/2006 | Ng | 224/269 |
| 2008/0185410 A1* | 8/2008 | Oomori et al. | 224/269 |
| 2009/0025515 A1* | 1/2009 | Shibata et al. | 81/57.4 |
| 2009/0278012 A1* | 11/2009 | Okouchi et al. | 248/304 |
| 2011/0108300 A1 | 5/2011 | Nagasaka et al. | |
| 2012/0023716 A1* | 2/2012 | Bluma | 24/567 |

FOREIGN PATENT DOCUMENTS

| | | | |
|---|---|---|---|
| EP | 1 327 500 | | 7/2003 |
| EP | 2 022 607 | | 2/2009 |
| EP | 2308652 A1 | * | 4/2011 |
| JP | 2006116685 A | * | 5/2006 |
| JP | 2006181709 A | * | 7/2006 |
| JP | 2009028841 A | * | 2/2009 |
| JP | 2010046739 A | * | 3/2010 |

OTHER PUBLICATIONS

International Preliminary Report on Patentability for International Application No. PCT/US2012/037927, mailed Nov. 19, 2013 (9 pages).

\* cited by examiner

MULTI-POSITION UTILITY HOOK ASSEMBLY FOR A TOOL

BACKGROUND

The present disclosure relates to power tools, such as powered fastener drivers, saws, drills, and other hand-held power tools typically used on construction sites, in factories, shops or other locations. More specifically, the present disclosure relates to a hook assembly for such tools.

In the construction industry, tradesmen frequently use power tools in a variety of locations. Often, it is necessary to have the tool operator's hands free for another task in places where there is no convenient surface on which to place the tool. Carpenters, for example, while using a power nailer or powered fastener-driving tool to frame a building, may need to correctly position the next stud or joist before nailing it into place. While working on roof joists, rafters or on ladders, the ability to secure the tool in a convenient location, such as a rafter or a user's belt, facilitates the performance of those tasks. Tradesmen will also save time and money by keeping their tools close by and within reach.

Hook assemblies for power tools have been disclosed in the prior art, such as U.S. Pat. No. 4,406,064 to Goss. This reference teaches a hook that is secured to the tool handle and housing through the holes that mount the handle to the housing. To stabilize the tool, the hanger extends along and covers a portion of the handle. In some tools, it is disadvantageous to cover a portion of the handle with the hanger. Also, power tools vary considerably in their shape, the position of the handle and the distribution of the tool's weight.

Mounting of a hook on the top of a tool near the handle also may result in decreased visibility for the user. Many tools are designed to have the user look over the tool to the workpiece in order to direct its movement. In most cases, this requires looking past or near the handle of the tool. When deployed in a position to hold the tool, conventional hooks often obscure the user's field of vision. Although the prior art devices are adjustable to a position close to the body of the tool, it is inconvenient to keep moving the hook from one position to another each time the tool is used, then set aside.

Additionally, known hook assemblies for such power tools typically have only two positions, one when the hook is in use, and a second for stowing the hook out of the way while the tool is operated. In some circumstances, neither of these is a good option. In situations when the operator desires to place the tool on his belt, the position of the hook is not suitable for belt support.

There is a need for an improved hook assembly for a power tool that addresses the above-listed issues of conventional tools.

SUMMARY

Various embodiments of the present disclosure provide an improved multi-position hook assembly for a tool that mounts directly to the tool housing. The hook assembly enables the user to hang the power tool from either side of the tool in a variety of locations, including on fixed structures such as ladders or rafters, as well as on a user's belt. In addition, the hook assembly is movable laterally relative to each side of the tool to accommodate left and right-handed users.

More specifically, the multi-position hook assembly for use in a tool includes a hook having a first leg and a second leg joined by a top span member, and a mounting member configured for slidably receiving the top span member and releasably locking the hook in a plurality of positions.

In an embodiment, a multi-position hook assembly for use in a tool is provided that includes a hook having a first leg extending from a first side of the hook and a second leg extending from an opposing, second side of the hook. The first and second legs of the hook are joined by a top span member including a plurality of notches. A mounting member is attached to the tool and defines a channel and a receptacle, where the channel is configured to slidably receive the hook. A lock assembly is positioned in the receptacle and includes a lock button that is movable between a depressed and a non-depressed position, and a biasing member for biasing the lock button to the non-depressed position. A cover plate is mounted on the mounting member such that the top span member of the hook is positioned between the cover plate and the mounting member. In operation, the hook is slidable between a plurality of positions defined by the notches when the lock button is in the depressed position, and is secured at a designated one of the plurality of positions when the lock button is moved to the non-depressed position for engaging a respective one of the notches associated with the designated position.

DETAILED DESCRIPTION

Figure 1:
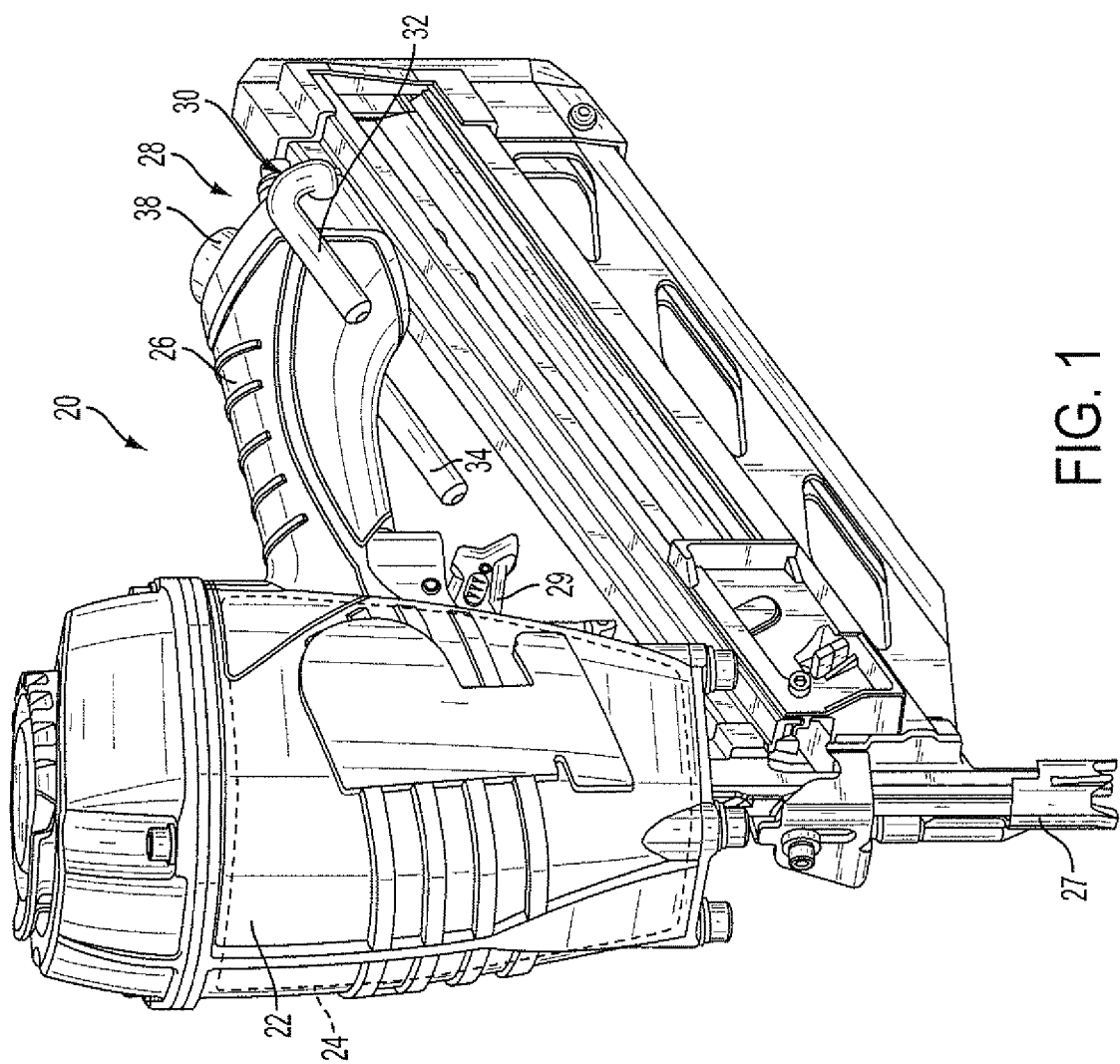
FIG. 1 is a side perspective view of a tool equipped with the multi-position hook assembly in accordance with an embodiment of the present disclosure.

Referring now to FIG. 1, a pneumatically-powered, fastener-driving tool 20 suitable for incorporating the multi-position hook assembly is shown. The tool 20 includes a main housing 22, usually die cast metal, however, other materials are contemplated. The main housing 22 encloses a power unit 24 (shown hidden). In certain embodiments, the power unit 24 is pneumatic, however, combustion-powered units are contemplated as disclosed in commonly assigned U.S. Pat. Nos. 4,483,473; 4,522,162; 6,145,724; and 6,679,414, all of which are incorporated by reference. The main housing 22 also includes a handle 26. When a workpiece contact element 27 is depressed against a workpiece and a trigger 29 is pulled, the power unit 24 causes a piston with a driver blade (not shown) to travel under pressure to drive a fastener as is well known in the art. While the tool 20 is depicted as being of one type of a fastener-driving tool, other types of fastener-driving tools, as well as other portable power tools, including but not limited to saws and drills, are contemplated as having the potential of incorporation of the multi-position hook assembly.

Figure 3:
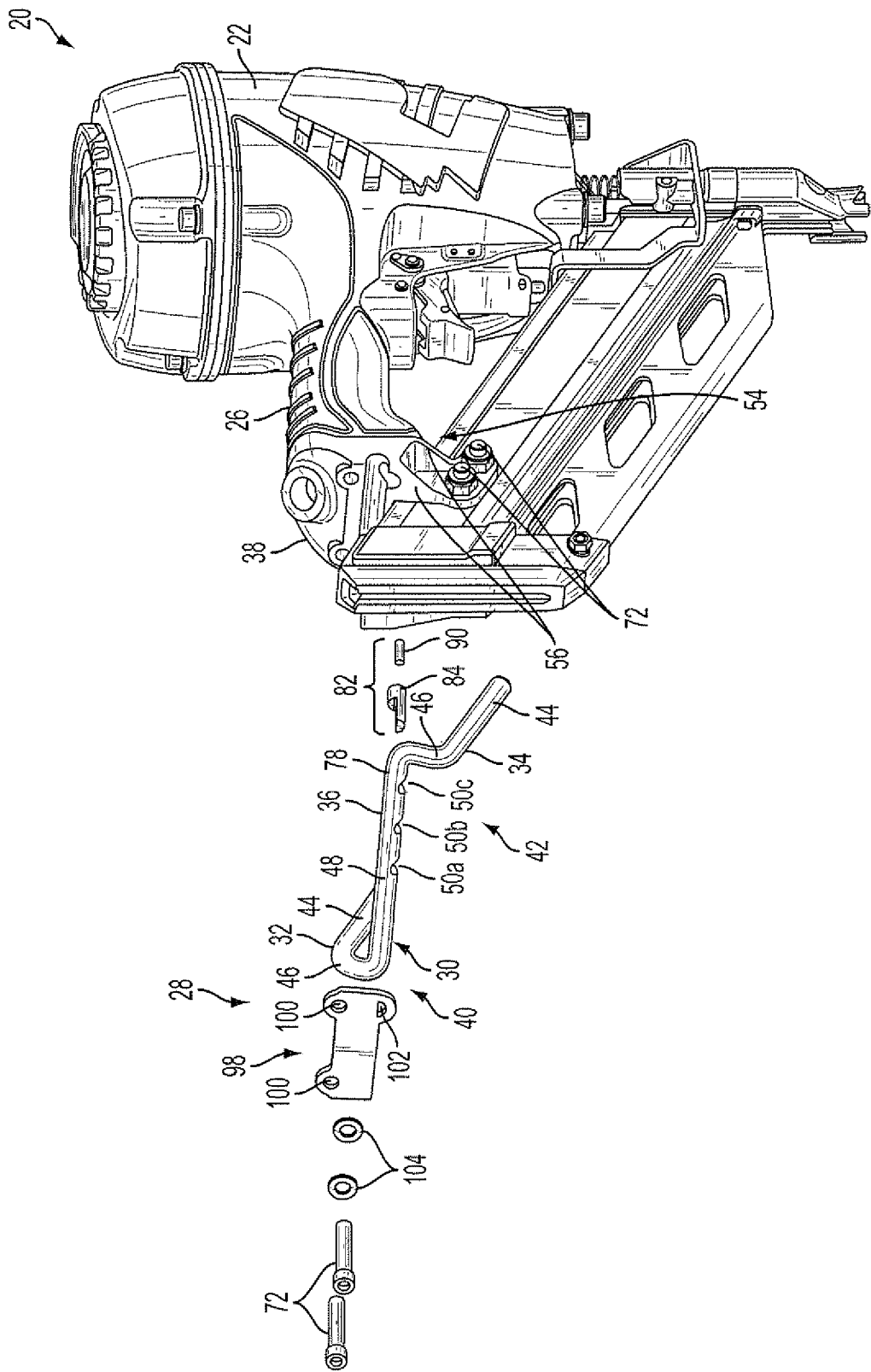
FIG. 3 is an exploded rear perspective view of the multi-position hook assembly of FIG. 1 relative to mounting member secured to the tool.
Figure 4:
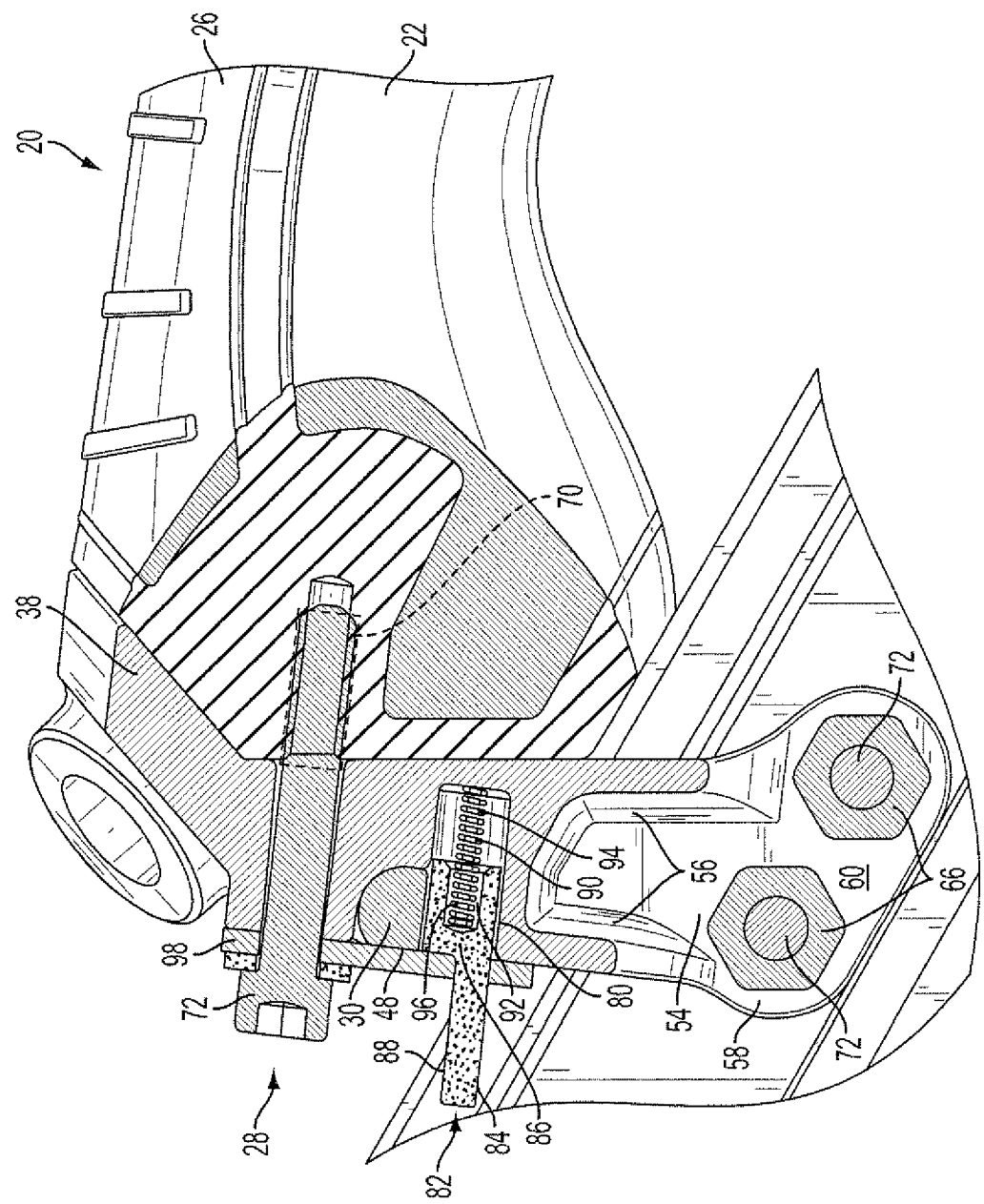
FIG. 4 is a fragmentary, vertical cross-section view of the tool and the multi-position hook assembly of FIG. 1.
Figure 5:
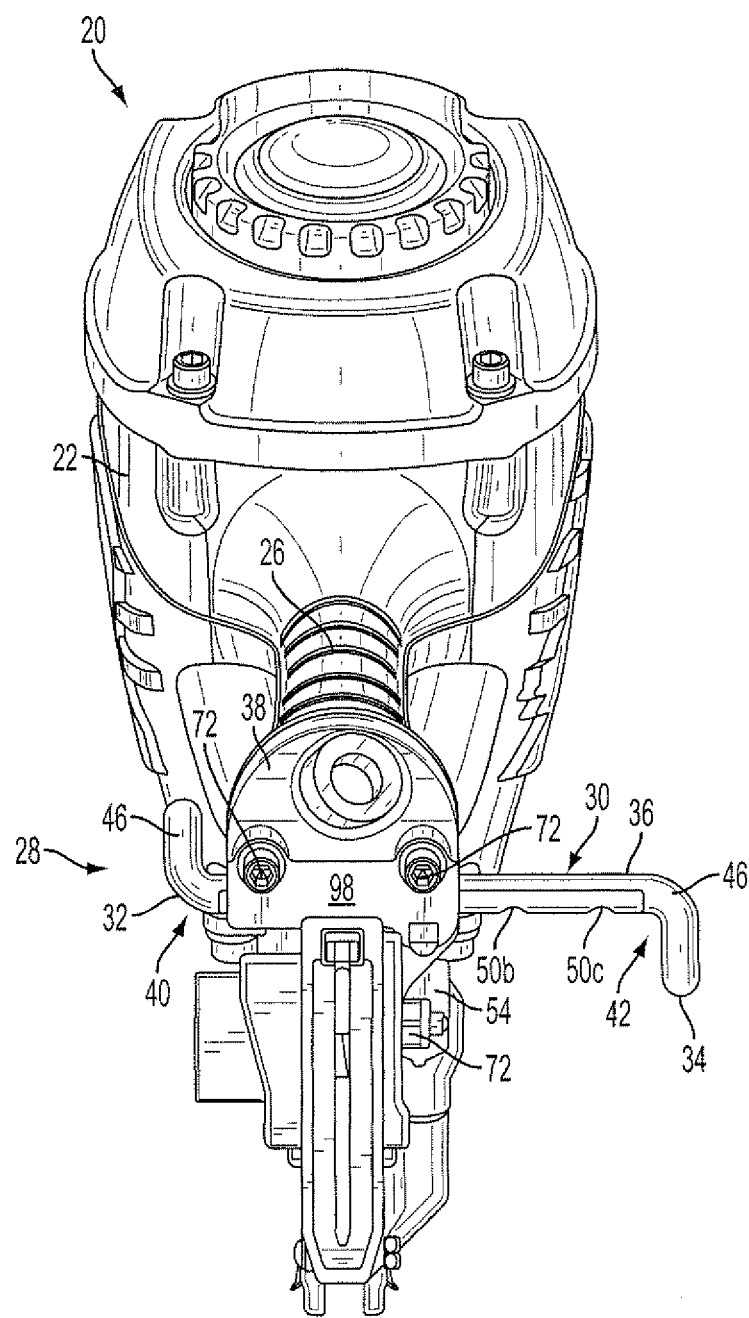
FIG. 5 is a rear perspective view of the tool and the multi-position hook assembly of FIG. I showing the hook assembly in a first position.

Referring now to FIGS. 1, 3 and 4, the multi-position hook assembly 28 includes a hook 30 having a first leg 32 and a second leg 34 joined and spaced apart by a top span member 36. The hook assembly 28 includes a mounting block or mounting member 38 configured for slidably receiving the top span member 36 of the hook 30 and for releasably locking the hook in more than one position.

The hook 30 is preferably constructed from a single length of formed wire. However, it should be appreciated that other materials and fabrication techniques are contemplated. As seen in FIG. 3, the first and second legs 32, 34 of the hook 30 extend from opposing ends 40 and 42 of the top span member 36. The first and second legs 32, 34 are each generally L-shaped and include a top member 44 and a side member 46 where the side member is integrally formed with a respective end 40, 42 of the top span member 36. In the preferred embodiment, the hook 30 is configured so that the first and second legs 32, 34 extend from opposing sides of the top span member 36 at 90° angles relative to the span member to allow the hook to be easily secured to a belt loop, framing member, ladder, scaffold and other similar structures from either side of the tool 20. It should be appreciated that other angles of orientation are contemplated.

As shown in FIGS. 3 and 4, the top span member 36 has a generally round or circular cross-sectional shape with one side that is machined as a flat surface 48. Three semi-circular notches 50a, 50b and 50c are formed on the top span member 36 for securing the hook 30 in different positions relative to the mounting member. It should be appreciated that the top span member 36 of the hook 30 may include one or a plurality of notches 50a, 50b and 50c.

Figure 2:
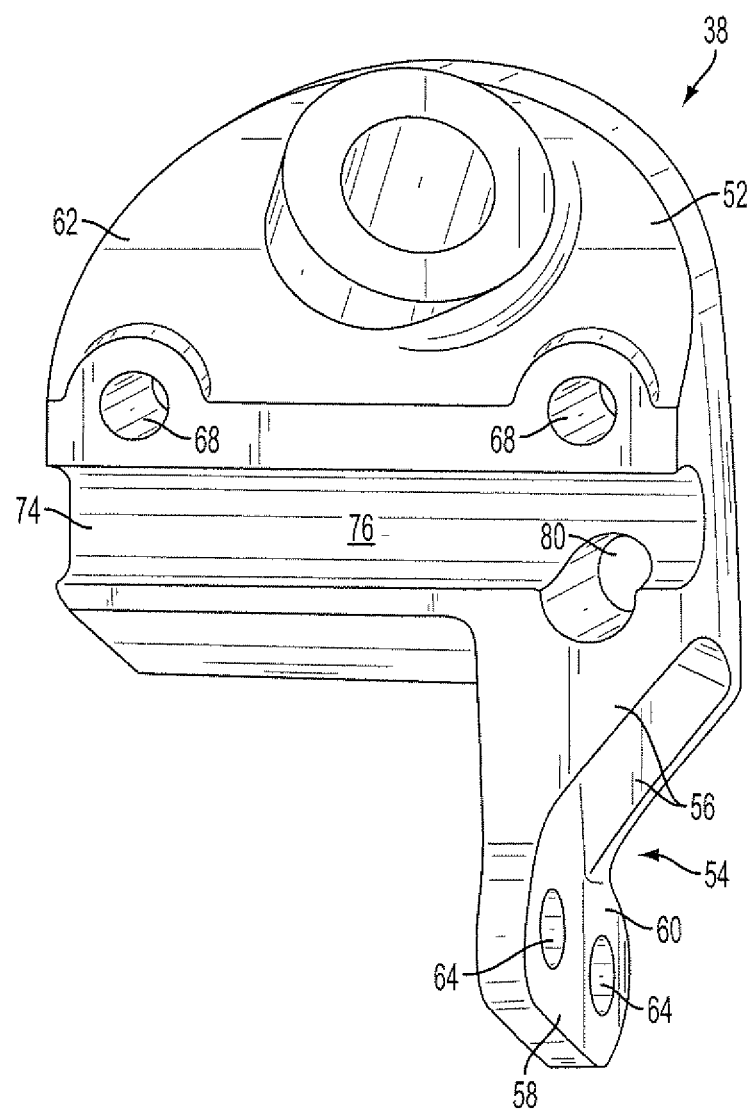
FIG. 2 is an enlarged perspective view of the mounting member of the multi-position hook assembly of FIG. 1.

Referring now to FIGS. 2 and 4, the mounting member 38 is preferably integrally formed and includes a body 52 and a mounting arm 54 extending from the body. The mounting arm 54 includes spaced triangular gusset-like supports 56 and a side mounting portion 58 having an outer surface 60 that is transverse to a front surface 62 of the body 52. The front surface 62 faces the rear of the tool 20. The side mounting portion 58 defines a pair of through-holes 64 that align with corresponding through-holes (not shown) formed in the magazine of the tool 20 and are used to mount the magazine to the tool. Similarly, the body 52 defines a pair of through-holes 68 that are aligned with threaded openings 70 on the end of the tool 20. Suitable fasteners, such as threaded bolts 72, are inserted through the through-holes 64, 68 and are threaded and secured using locknuts 66 on the magazine or in the threaded openings 70 on the tool 20 for respectively mounting the magazine and the mounting member 38 to the tool.

The body 52 of the mounting member 38 defines a semi-circular channel 74 that is configured for slidably receiving the hook 30. Specifically, the channel 74 has a rounded inner surface 76 that corresponds to a rounded exterior 78 of the hook 30. The size of the channel 74 is dimensioned to be slightly larger than a diameter of the hook 30 so that the hook freely slides laterally within the channel.

As shown in FIG. 2, a circular receptacle 80 is defined by the body 52 and is positioned at least partially in the channel 74. The receptacle 80 is configured to receive a lock assembly 82 for locking the hook 30 at a particular position relative to the mounting member 38.

Referring now to FIGS. 3 and 4, the lock assembly 82 includes a lock actuator or lock button 84 having a generally circular first end 86 and a semi-circular second end 88, and a biasing member, such as coil spring 90. The first end 86 of the lock button 84 defines an inner receptacle 92 sized to receive the coil spring 90 for securing an end of the coil spring to the lock button. A first end 94 of the coil spring 90 is positioned in the receptacle 80 on the body 52 of the mounting member 38 and an opposing second end 96 is positioned in the lock button receptacle 92 (see FIG. 4). Thus, the coil spring 90 compresses as the lock button 84 is depressed or moved to a depressed position and expands and biases the button 84 outwardly when the button is released to the default non-depressed, or locked position (FIG. 4). As further described below, the circular first end 86 of the lock button 84 is configured to matingly engage one of the notches 50a, 50b or 50c on the top span member 36 of the hook 30 for securing the hook at a particular position. When the lock button 84 is depressed, the semi-circular end 88 of the button moves into the notch 50a, 50b or 50c thereby disengaging the hook 30 from the button 84 and allowing the hook to slide laterally in the channel 74.

Referring to FIG. 3, a generally planar cover plate 98 secures the hook 30 and the lock assembly 82 in position on the mounting member 38. In addition, the cover plate 98 prevents the hook 30, the button 84 and the spring 90 from becoming separated from the mounting member 38. The cover plate 98 defines a pair of spaced mounting holes 100 on one side, and a semi-circular through-hole 102 on an opposing side. The mounting holes 100 are aligned with corresponding through-holes 68 on the body 52 of the mounting member 38 and fasteners, such as the threaded bolts 72 described above, are inserted into each of the mounting holes 100, through the through-holes 68 and into threaded openings or receptacles 70 on the tool 20 to secure the cover plate 98 on the mounting member. To further secure the fasteners in position, a lock washer 102 is respectively placed on each of the bolts 72 prior to securing the bolts to the mounting member 38 and the tool 20.

As shown in FIG. 4, the flat surface 48 of the top span member 36 is placed against the planar cover plate 98 to prevent the hook 30 from rotating within the channel 74 after assembly. This construction enables the hook 30 to remain stably in position during use. The lock button 84 is positioned slightly below the hook 30 so that the semi-circular end 88 of the lock button slidingly engages the corresponding semi-circular hole 102 on the cover plate 98. The end 88 protrudes outwardly from the cover plate 98 so that a user can easily depress the lock button 84. As described above, the round end 86 of the lock button 84 engages a corresponding one of the notches 50a, 50b or 50c on the hook 30 when the button is in the non-depressed position.

Referring now to FIGS. 3 and 5-7, in the illustrated example, the hook 30 is adjustable to three different positions for securing the tool 20 to a belt, a framing member, a ladder or other structure. In a first position shown in FIG. 5, the hook 30 is moved laterally within the channel so that the leftmost notch 50a, as viewed from the rear end of the tool 20, is aligned with and engaged by the lock button 84. The first leg 32 abuts the mounting member 38 and the second leg 34 is spaced a designated distance from the mounting member such that a framing member, such as a stud or joist, fits between the second leg and the mounting member for temporarily hanging the tool 20 from the framing member or joist. Specifically, an outer surface 78 (FIG. 3) of the hook 30 rests on an outer surface of a framing member and the second leg 34 extends along and engages a transverse side or surface of the framing member for keeping the hook assembly 28 from falling off of the framing member. To move the hook 30 to a different position, a user depresses the lock button 84, which disengages the lock button from the leftmost notch 50*a* and allows the hook 30 to move laterally within the channel 74 relative to the mounting member 38 without the use of tools.

Figure 6:
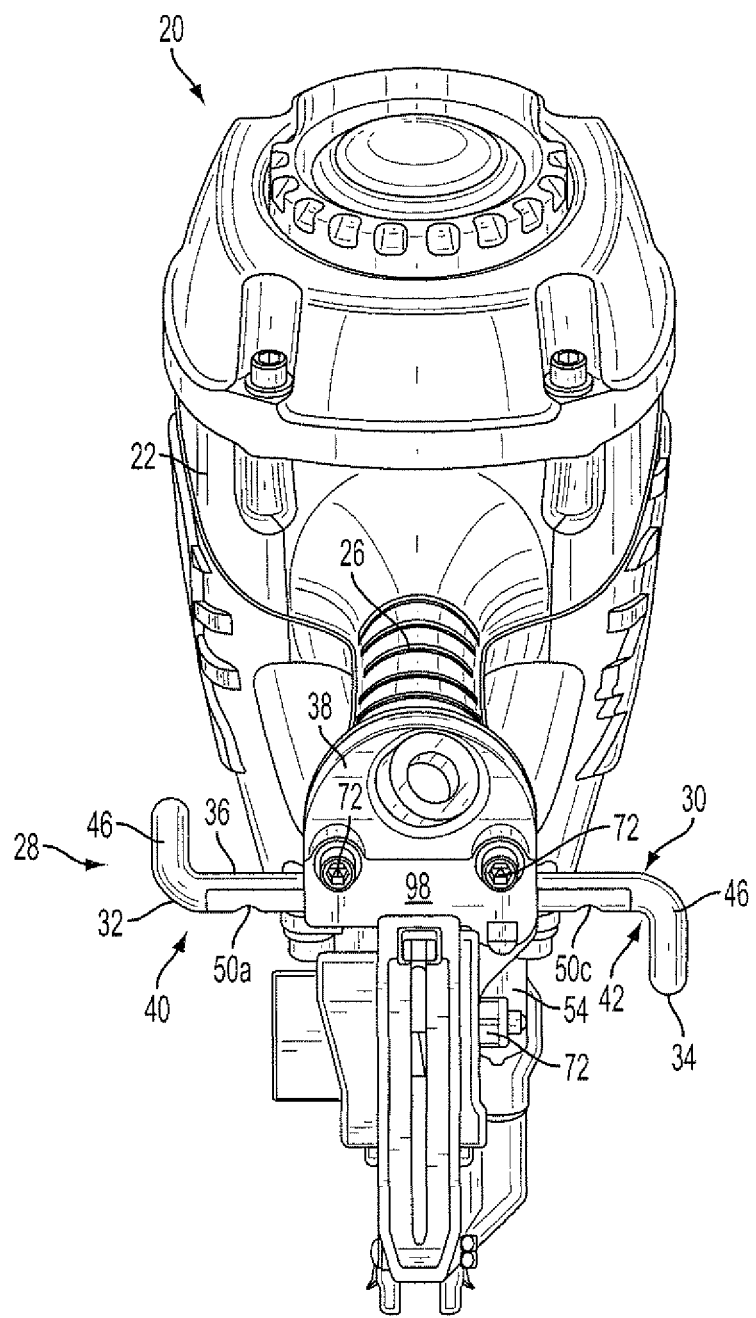
FIG. 6 is a rear perspective view of the tool and the multi-position hook assembly of FIG. 1 showing the hook assembly in a second position.

In FIG. 6, the hook 30 is in a second position where the lock button 84 is engaged with the centermost notch 50*b* on the top span member 36. In this position, the first and second legs 32 and 34 of the hook 30 are spaced an equal distance from the mounting member 38 to allow a user to insert the first or second leg respectively over their belt or upper pants edge on either the left side or the ride side of their body.

Figure 7:
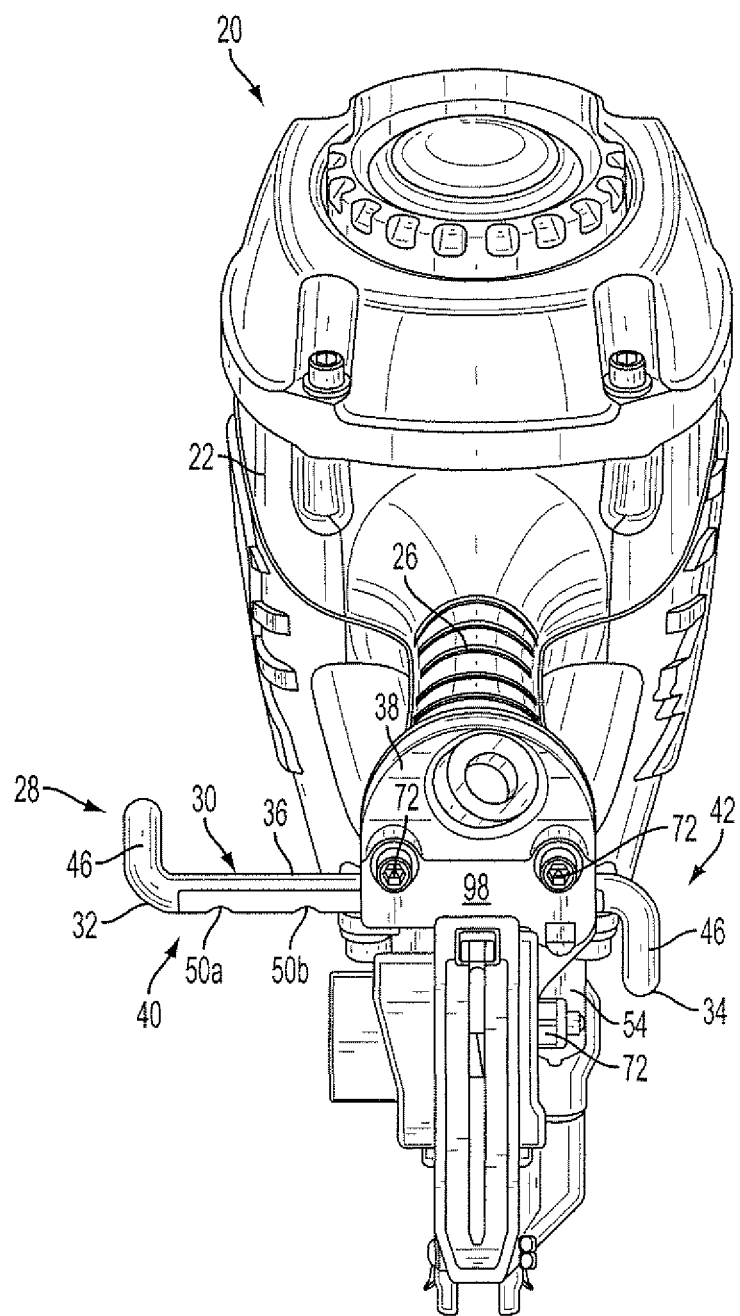
FIG. 7 is a rear perspective view of the tool and the multi-position hook assembly of FIG. 1 showing the hook assembly in a third position.

In FIG. 7, the hook 30 is moved so that the lock button 84 is engaged in the rightmost notch 50*c* on the top span member 36 as the hook assembly 28 is viewed from the rear end of the tool 20. In this position, the first leg 32 is spaced a designated distance from the mounting assembly 38 for receiving a framing member between the first leg and the mounting member. The positioning of the top span member 36 along one surface of the framing member and the top member 44 of the first leg 32 on a transverse side of the framing member enables the hook 30 to stably and securely hold the tool 20 in place on the framing member.

As described above, the hook 30 is movable between several different positions to enable a user to temporarily and selectively secure the tool 20 to a framing member, a user's belt, a ladder, a scaffold or other structure quickly and easily regardless of whether the framing member, belt or structure is on a user's right side or their left side or whether the user is right-handed or left-handed, Furthermore, the secure engagement of the lock button 84 in the notches 50*a*, 50*b* and 50*c* on the hook 30 provides a stable and safe way to temporarily secure a tool 20 on a framing member, belt or other structure on a job site.

While particular embodiments of the multi-position hook assembly for a power tool have been described herein, it will be appreciated by those skilled in the art that changes and modifications may be made thereto without departing from the invention in its broader aspects and as set forth in the following claims.

The invention claimed is:

1. A multi-position hook assembly for a tool, said hook assembly comprising:
    a hook having a first leg and a second leg joined by a top span member, said top span member having a longitudinal axis and including opposing ends, said first leg and said second leg each including a side member and a top member, said side members of said first leg and said second leg each having a longitudinal axis and extending transversely and in opposite directions from said opposing ends of said top span member, said top member of said first leg having a longitudinal axis and extending from said side member of the first leg such that the longitudinal axis of said top member is nonparallel to a first plane including the longitudinal axes of the top span member and the side member of the first leg, the top member of the second leg having a longitudinal axis and extending from the side member of the second leg such that the longitudinal axis of said top member is nonparallel to a second plane including the longitudinal axes of the top span member and the side member of the second leg; and
    a mounting member configured to slidably receive said top span member and releasably lock said hook in a plurality of positions.

2. The hook assembly of claim 1, wherein for each of the first leg and the second leg, said top member and said side member of said leg are generally positioned to form an L-shape.

3. The hook assembly of claim 1, wherein said top span member defines a plurality of notches, said notches associated with different positions of said hook.

4. The hook assembly of claim 3, further comprising a lock button movably connected to said mounting member and configured to selectively engage each of said notches, wherein said lock button secures said hook in one of said positions.

5. The hook assembly of claim 1, further comprising a lock assembly positioned in a receptacle on the mounting member, said lock assembly configured to temporarily lock the hook at one of the plurality of positions.

6. The hook assembly of claim 5, wherein said lock assembly includes a lock button defining a receptacle and being movable between a depressed position and a non-depressed position, and a biasing member including an end positioned in said receptacle to bias said lock button to said non-depressed position.

7. The hook assembly of claim 1, further comprising a cover plate positioned over said hook and secured to said mounting member, said top span member of said hook including a flat surface that engages said cover plate to prevent rotation of said hook.

8. The hook assembly of claim 1, wherein said mounting member further comprises an arm extending along a side of the tool to enable connection of the mounting member to the tool.

9. The hook assembly of claim 1, wherein said hook includes a first end and a second end and said mounting member is configured to releasably lock said hook:
    (1) in a first position in which said first end abuts said mounting member and said second end is positioned a first designated distance from said mounting member,
    (2) in a second position in which said first and second ends are positioned an equal distance from opposing sides of said mounting member, and (3) in a third position in which said second end abuts said mounting member and said first end is positioned a second designated distance from said mounting member.

10. A multi-position hook assembly for a tool, said hook assembly comprising:
    a hook having a first leg extending in a first direction transversely from a first end of said hook and a second leg extending in a second direction transversely from an opposing, second end of said hook, wherein said first direction is opposite from said second direction, said first and second legs each including a side member and a top member, said side members being joined by a top span member having a longitudinal axis and including a plurality of notches, said side members each having a longitudinal axis and extending transversely and from opposing sides of said top span member, said top member of said first leg having a longitudinal axis and extending from said side member of the first leg such that the longitudinal axis of said top member is nonparallel to a first plane including the longitudinal axes of the top span member and the side member of the first leg, the top member of the second leg having a longitudinal axis and extending from the side member of the second leg such that the longitudinal axis of said top member is nonparallel to a second plane including the longitudinal axes of the top span member and the side member of the second;
    a mounting member defining a channel and a receptacle, said channel configured to slidably receive said hook;
    a lock assembly positioned in said receptacle and including a lock button movable between a depressed position and a non-depressed position, and a biasing member biasing said lock button to said non-depressed position; and a cover plate mounted on the mounting member, said top span member of said hook being positioned between said cover plate and said mounting member, wherein the hook is slidable between a plurality of positions defined by said notches when said lock button is in said depressed position, and is secured at a designated one of said plurality of positions when said lock button is moved to said non-depressed position to engage a respective one of said notches associated with said designated position.

11. The hook assembly of claim 10, wherein said top span member of said hook includes a flat surface that engages said cover plate to prevent rotation of said hook in said channel.

12. The hook assembly of claim 10, wherein said lock button includes a circular first end matingly engageable to each of said notches, and a semi-circular second end that is disengaged from said notches to enable said hook to laterally slide within said channel.

13. The hook assembly of claim 10, wherein said first and second legs are each at 90° angles relative to said top span member.

14. The hook assembly of claim 10, wherein said cover plate defines an opening sized to slidably receive said lock button, said lock button extending outwardly a designated distance from said cover plate when said lock button is in said non-depressed position.

15. The hook assembly of claim 10, wherein a first one of said plurality of notches is associated with a first position in which said first leg abuts said mounting member and said second leg is positioned a designated distance from said mounting member, a second one of said notches is associated with a second position in which said first and second legs are positioned an equal distance from opposing sides of said mounting member, and a third one of said notches is associated with a third position in which said second leg abuts said mounting member and said first leg is positioned a designated distance from said mounting member.

* * * * *